(No Model.) 2 Sheets—Sheet 1.
D. M. LEGAT.
PIPE COUPLING.
No. 390,240. Patented Oct. 2, 1888.
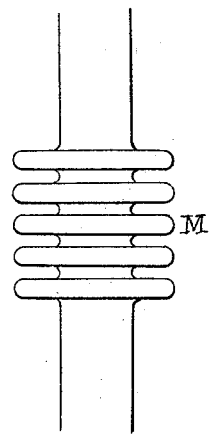
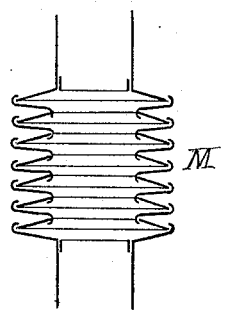
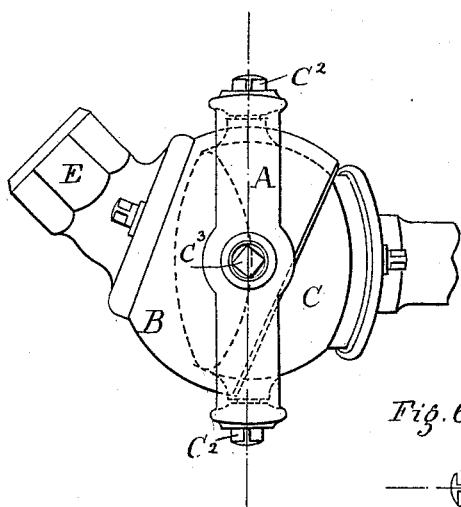
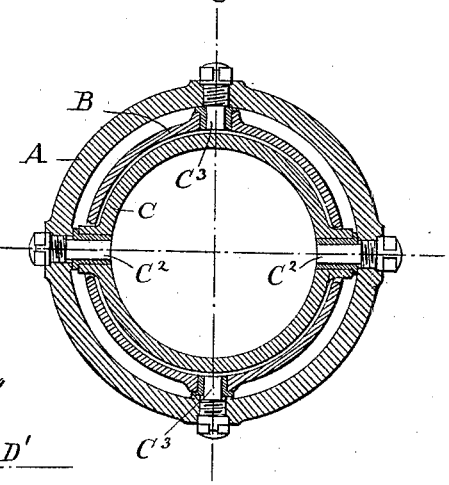
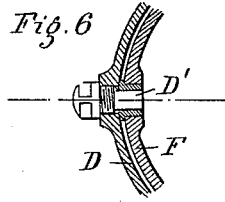
Witnesses:
Inventor:
Désiré Mathurin Legat
by Brandon & son
Attorneys (No Model.)  2 Sheets—Sheet 2.
D. M. LEGAT.
PIPE COUPLING.
No. 390,240. Patented Oct. 2, 1888.
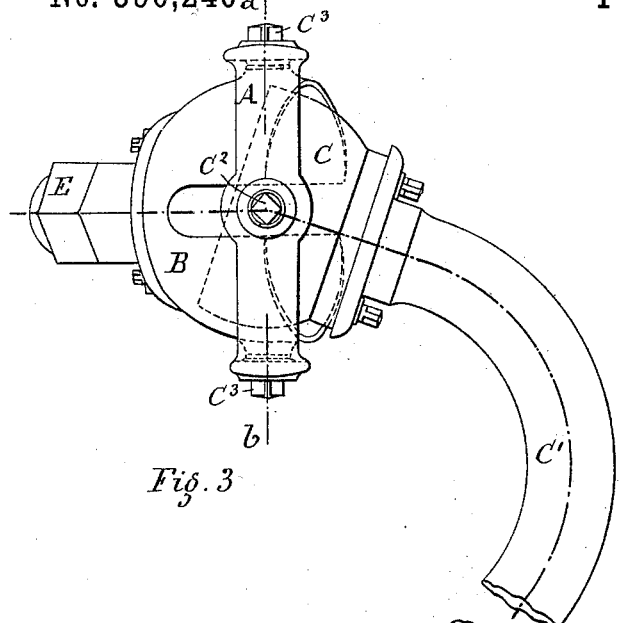
Fig. 3
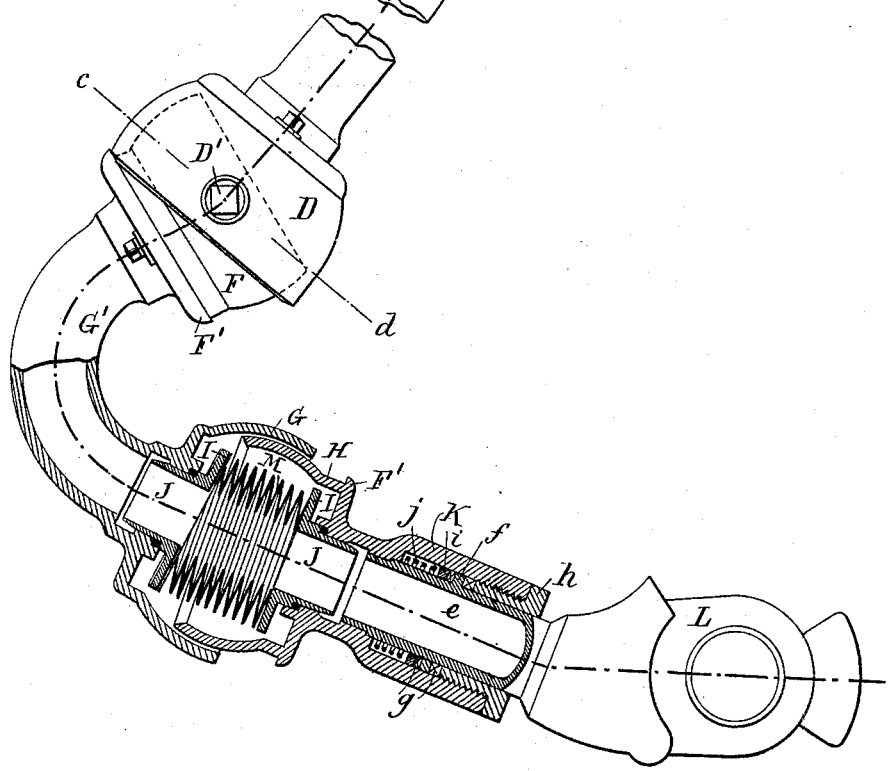
Witnesses:
Gombert
DHBrandon
Inventor:
Désiré Mathurin Legat
by Brandon Son
attorneys

UNITED STATES PATENT OFFICE.

DÉSIRÉ MATHURIN LEGAT, OF PARIS, FRANCE.

PIPE-COUPLING.

SPECIFICATION forming part of Letters Patent No. 390,240, dated October 2, 1888.

Application filed June 4, 1887. Serial No. 240,255. (No model.) Patented in France October 20, 1886, No. 179,148; in Belgium April 20, 1887, No. 77,147; in Germany May 17, 1887, No. 41,626; in Italy June 30, 1887, XLIII, 313; in England July 23, 1887, No. 10,321; in Spain August 10, 1887, No. 11,219, and in Austria-Hungary January 17, 1888, No. 26,827 and No. 60,856.

*To all whom it may concern:*

Be it known that I, DÉSIRÉ MATHURIN LEGAT, engineer, a citizen of the Republic of France, residing in Paris, France, have invented a certain new and useful Improvement in Flexible Piping for Air-Brakes, (for which I have obtained patents in the following countries, namely: France, October 20, 1886, No. 179,148; Belgium, April 20, 1887, No. 77,147; Italy, June 30, 1887, No. 313, Vol. 43; Germany, May 17, 1887, No. 41,626; England, July 23, 1887, No. 10,321; Spain, August 10, 1887, No. 11,219, and Austria-Hungary, January 17, 1888, Nos. 26,827 and 60,856,) of which the following is a clear and exact description.

The object I have in view is to replace the ordinary rubber pipes used for connecting the air-pipes between railway-cars provided with air or vacuum brakes by metallic piping capable of offering the required flexibility.

This improved metallic flexible piping (for which I have obtained Letters Patent in France, dated October 20, 1886, No. 179,148; in Great Britain, dated July 23, 1887, No. 10,321; in Belgium, dated April 20, 1887, No. 77,147, and in Germany, dated May 17, 1887, No. 41,626) is characterized by the employment of metallic plaited membranes placed between rigid portions of pipes, the said rigid portions being ended by hemispherical joints, so as to form a non-extensible, flexible, air-tight, and resisting connection. The flexible membranes may be formed of drawn pipes plaited to form deep, parallel, or helicoidal grooves, (see Figure 1,) or of a series of flat or cupped disks suitably secured together. (See Fig. 2.) This metallic flexible membrane is mainly intended to form the flexible portion of metallic piping used for connecting the air-pipes between cars provided with automatic air or vacuum brakes.

Fig. 3 shows one-half of a connecting portion for air-pipes in accordance with my improvement. Figs. 4, 5, and 6 are details.

In Fig. 3, L is the usual coupling, which is secured in a stuffing-box, K, cast with a hemisphere, H, which is let into a second hemisphere, G. The hemisphere G forms part of a metal pipe, G', the other end of which has also a hemisphere, F. The hemisphere F is let into a hemisphere, D. Both hemispheres H G and F D are jointed to each other by means of external pivots, D', upon which they can execute the required angular motion, and of which one only is shown in Fig. 6, in section on the line *c d*, Fig. 3. The hemisphere D is connected by a metal pipe, C', to a similar hemisphere, C, jointed by horizontal pivots $C^2$ to a ring, A, having vertical pivots $C^3$, by means of which it is jointed to a hemisphere, B, terminating in a nozzle, E, which is screwed onto the end of the fixed pipe secured to the car.

Fig. 5 is a section of Fig. 3 through the line *a b*.

The above-mentioned parts, connected as hereinbefore described, constitute metallic jointed tubing non-extensible, very strong, and allowing the flexible membrane to yield to all directions, this being more particularly obtained by the universal joint formed of the parts C, A, and B.

The coupling L, Fig. 3, may be cast with the extreme portion K or be connected thereto by screwing or otherwise. I have, however, devised improved means for producing an air-tight but yet movable joint. K is the stuffing-box. *e* is a pipe formed with the coupling L, and having an annular flange, *f*, against each side of which is a stuffing-piece, *g g*, pressed on one side by a nut, *h*, and on the other side by a metal washer, *i*, and a spring, *j*. This means of connecting the coupling L to the piping offers every facility of rotation of the coupling on its axis, and at the same time insures tightness by the automatic action of the air-pressure.

In the hereinbefore-described arrangement the movability of the various parts H, G, G', F, D, C', C, and A is derived from the described several joints, while the tightness at the joints is derived from the plaited metallic membrane M, formed in any of the two manners shown at Figs. 1 and 2, or otherwise, and inserted at the meeting-point of each pair of swiveling hemispheres.

To avoid needless repetition, the membrane is not shown at all of the flexible joints; but Figs. 1 and 2 and the sectional hemispheres G H of Fig. 3 sufficiently display them.

The fixing of the plaited membrane M to the hemispheres may be effected in various ways. In Fig. 3 each end of the membrane M is fixed to a flange or disk, I, formed on or with a sleeve, J, let into a corresponding portion of the hemispheres H and G, respectively. Any suitable packing interposed between the parts insures absolute hermeticity by the energetic action of the pressure exerted internally.

Each of the hemispheres H and F is formed with an external circular projection, F', Fig. 3, abutting against each other when the maximum angular motion they are capable to execute has been accomplished, so as to thus securely limit the motion of the membranes without injuring them. As, on the other hand, the internal pressure and all other efforts exerted are necessarily taken up by the pivots and sleeves, it follows that the extension of the membranes is effectively limited, and that they are protected against shocks and any other abnormal strains.

The membranes can be protected against dust, rust, and such like by surrounding them with a soft and water-proof jacket held at its ends by means of metal rings or otherwise.

I claim—

1. In flexible metallic piping for vacuum or for fluids under pressure, the means for connecting a rigid tube, C', to the end of an air-pipe fixed to a railway-car, consisting in a universal joint composed of the ring A, hemisphere C, hemisphere B, pivots $C^2$ $C^2$ $C^3$ $C^3$, internal flexible membrane, M, and screwed nozzle E, substantially as shown and described.

2. The combination, with the hemisphere G, of the hemisphere H, having the stuffing-box K projecting therefrom, coupling L, tube $e$, having an annular flange, $f$, stuffing-pieces $g$ $g$, washer $i$, spring $j$, and nut $h$, as and for the purposes described.

3. In combination with the two rigid pipes G' and C', two hemispheres arranged to be turned one on the other, a metallic membrane interposed between the pipes and inclosed by the hemispheres, sleeves J J, having disks I I, and their packings, these disks being placed at each end of the membrane, all substantially as and for the purpose described.

4. In combination, a set of pipes, G' C', a set of hemispheres, H, G, F, D, and C, respectively connected with said pipes, circular projections F', membranes M, severally inclosed within the hemispheres, a stationary hemisphere, B, terminating in a nozzle, E, a pivoted ring, A, jointed to hemisphere B, and a coupling, L, having a stuffing-box, K, substantially as shown and described.

In witness whereof I have hereunto signed my name in the presence of two subscribing witnesses.

DÉSIRÉ MATHURIN LEGAT.

Witnesses:
R. H. BRANDON,
C. W. TIRNHABER.